United States Patent [19]

Springer et al.

[11] Patent Number: 4,885,655

[45] Date of Patent: Dec. 5, 1989

[54] WATER PUMP PROTECTOR UNIT

[75] Inventors: Lamar D. Springer, Spring Valley; Larry D. Springer, Dayton; William W. Marshall, Centerville, all of Ohio

[73] Assignee: Spring Valley Associates, Inc., Dayton, Ohio

[21] Appl. No.: 243,886

[22] Filed: Sep. 13, 1988

Related U.S. Application Data

[63] Continuation-in-part of Ser. No. 106,048, Oct. 7, 1987, Pat. No. 4,841,404.

[51] Int. Cl.[4] .............................................. H02H 7/09
[52] U.S. Cl. ........................................ 361/30; 361/79; 318/789; 318/790
[58] Field of Search ................. 361/22, 30, 79, 85; 318/781, 785, 786, 789, 790, 792

[56] References Cited

U.S. PATENT DOCUMENTS

| | | | |
|---|---|---|---|
| 2,636,153 | 4/1953 | Rech | 318/789 |
| 2,953,722 | 9/1960 | Willis . | |
| 3,417,290 | 12/1968 | Craddock | 361/30 |
| 3,519,910 | 7/1970 | Pfaff et al. . | |
| 3,600,657 | 8/1971 | Pfaff et al. | 318/218 |
| 3,727,103 | 4/1973 | Finch et al. | 361/30 |
| 3,931,559 | 1/1976 | McKee | 318/455 |
| 3,953,777 | 4/1976 | McKee | 318/474 |
| 4,034,269 | 5/1977 | Wilkinson | 361/79 |
| 4,091,433 | 5/1978 | Wilkinson | 361/76 |
| 4,117,408 | 9/1978 | Comstedt | 328/133 |
| 4,286,925 | 9/1981 | Standish | 417/12 |
| 4,290,007 | 9/1981 | Fisher et al. | 323/270 |
| 4,378,520 | 3/1983 | Ford | 318/789 |
| 4,420,787 | 12/1983 | Tibbits et al. | 361/79 |
| 4,642,478 | 2/1987 | Noth | 301/118 |
| 4,703,387 | 10/1987 | Miller | 361/79 |

FOREIGN PATENT DOCUMENTS 676836  12/1963  Canada ............................. 307/326

*Primary Examiner*—Todd E. Deboer
*Attorney, Agent, or Firm*—Jacox & Meckstroth

[57] ABSTRACT

A water pump protector unit which includes electrical circuitry through which an electric motor is energized. The pump protector unit is primarily adapted for operation of a capacitor-start induction-run electric motor which operates a water pump. The electrical circuitry includes components for energization and deenergization of the start winding of a capacitor-start induction-run electric motor. The electrical circuitry senses the phase angle between the voltage and the current applied to the electric motor. When the phase angle indicates that the electric motor is operating without a load, the circuitry deenergizes the electric motor. Thus, the water pump is protected against damage which may occur when the water pump is operated without pumping water. Preferably, all of the components of the water pump protector unit are housed within a single cabinet.

7 Claims, 2 Drawing Sheets

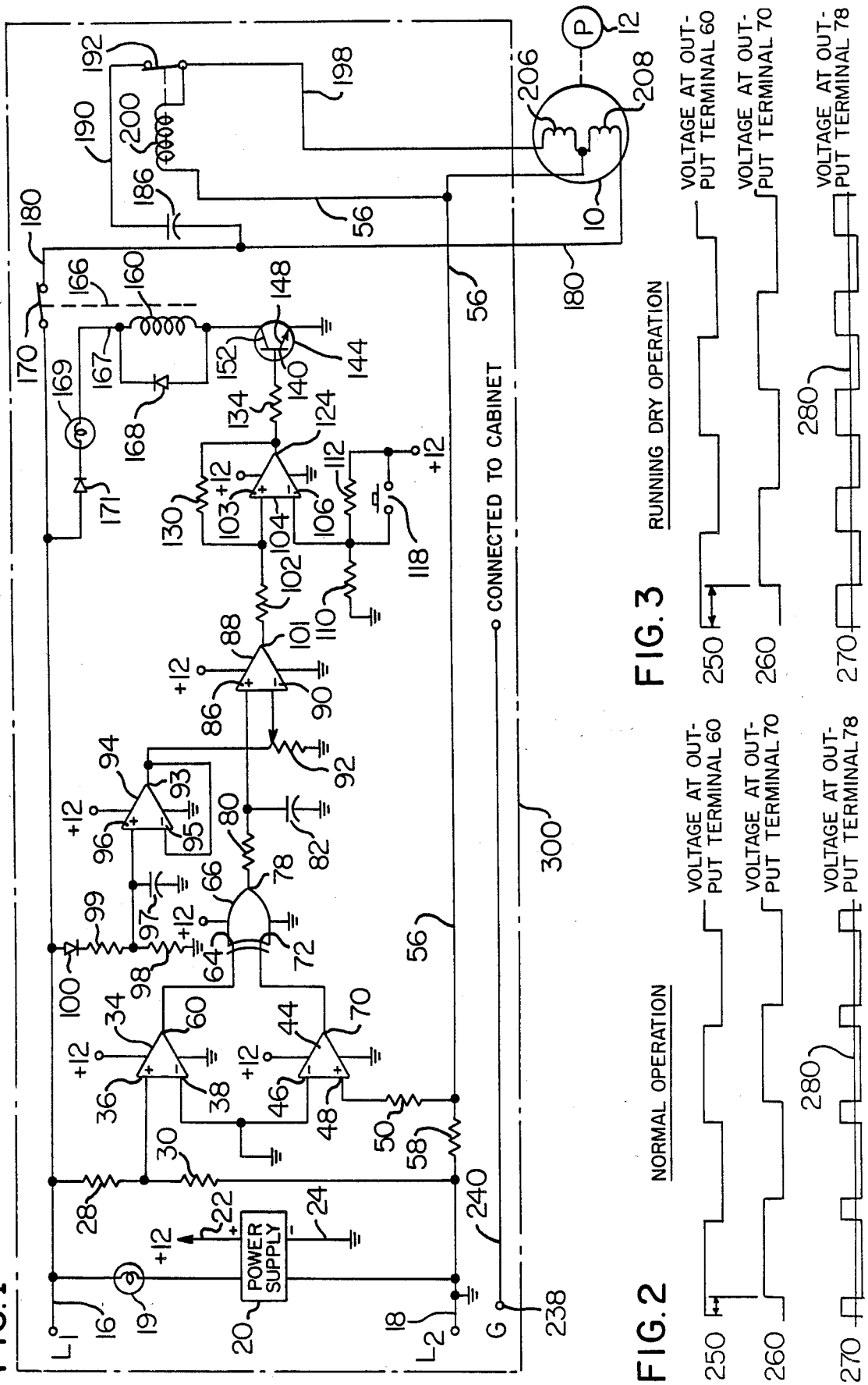

WATER PUMP PROTECTOR UNIT

RELATED APPLICATION

This patent application is a continuation-in-part of pending Patent application Ser. No. 106,048, filed Oct. 7, 1987 now Pat. No. 4,841,404, and is incorporated by reference herein.

BACKGROUND OF THE INVENTION

In numerous installations, a water pump and the electric motor which operates the water pump are submerged within the body of water from which water is pumped. In some water pump installations, a water pump and an electric driving motor may be located a considerable distance from the electric control unit which supplies electrical energy to the electric motor. In each water pump installation, there is a possibility that the supply of water at the pump may cease or a coupling between the driving electric motor and the water pump may break, or for some other reason the electric motor operates without pumping operation of the water pump. If the supply of water to the water pump ceases, the pump may be severely damaged if it is operated. If the coupling between the electric motor breaks or for some other reason the pump is operated without pumping action, a signal should be provided in regard to such a condition, and/or the motor should be deenergized.

Numerous types of water pump protector devices and indicator or signal circuits have been devised. Most of the pump protector devices require a separate mechanism to sense the water level condition and to provide a signal for manual or automatic deenergization of the electric driving motor. However, such devices require a separate electric circuit which extends from the body of water to the electric motor control unit. In most installations, the distances between the body of water and the electric motor control unit may be considerable and require long lengths of electric wire, as well as requiring a separate mechanism at the water level or in the body of water. Therefore, such protective devices have disadvantages. Pump protective or pump malfunction indicator devices and circuits which do not require separate mechanisms or circuits are usually complex and costly and are therefore objectionable.

The following patents disclose electric motor and/or liquid pump protective devices: 2,953,722, 3,417,290, 3,519,910, 3,600,657, 3,727,103, 3,931,559, 3,953,777, 4,034,269, 4,091,433, 4,117,408, 4,286,925, 4,290,007, 4,420,787, 4,642,478, 4,703,387.

In the past, each of the following units has been housed in a separate enclosure:

1. The voltage controlled motor start relay: This device is one of the more versatile devices for energization of capacitor-start induction-run motors. The relay is normally closed and the relay coil is connected in parallel with the start winding of the pump motor. As the counter electromotive force of the motor increases, the voltage applied to the relay coil increases and the relay operates. The start capacitor and the motor start winding are thus switched out of the circuit.

2. The motor start capacitor: This capacitor is connected in series with the start winding during starting operation. As the motor speed increases to near running speed the motor counter EMF increases and operates the motor start relay, switching out the capacitor and the motor start winding.

3. The motor running capacitor: In some cases a running capacitor is permanently connected in parallel with the running winding of the motor. The normal use of this capacitor is to increase the overall operating efficiency of the pump motor.

It is an object of this invention to provide electrical circuitry through which electrical energy is supplied to an electric motor which operates a liquid pump and in which the electrical circuitry deenergizes the electric motor if, for any reason, the liquid pump is not pumping liquid. Thus, it is an object of this invention to provide electrical circuitry which protects the liquid pump against damage and which may also serve as an indicator that the electric motor is operating without pumping action in the pump.

Another object of the invention is to provide a set of electric motor control components which is capable of operation of any one of a multiplicity of capacitor-start induction-run motors.

It is another object of the invention to provide means by which all of the motor control components are located within a single cabinet.

It is another object of this invention to provide in a single enclosure a complete versatile, substantially universal three wire pump motor start apparatus, which is uniquely configured and capable of starting and operating and controlling any capacitor start electric motor having a horsepower rating in the range of one-third horsepower to one and one-half horsepower. This combination provides for the installation of a single enclosure and for electrical connection to only a minimum number of electrical conductors therein. Thus, a plurality of separately mounted units is eliminated.

It is another object of this invention to provide such electrical circuitry and apparatus which is relatively low in cost to produce and install.

Other objects and advantages of this invention reside in the construction of parts, the combination thereof, the method of production, and the mode of operation, as will become more apparent from the following description.

SUMMARY OF THE INVENTION

A water pump protector unit of this invention is adapted to be joined to an electric motor which operates a liquid pump, such as a water pump. The electrical circuitry comprises means to sense the phase angle between the voltage and the current supplied to an electric motor. The circuitry also includes means for comparing the phase angle between the voltage and the current and to deenergize the electric motor when the phase angle between the voltage and the current exceeds a predetermined magnitude.

In this invention, a motor protection device, such as that disclosed in U.S. Pat. No. 4,420,787, is simplified, while providing complete protection for a liquid pump and pump motor. The pump protection apparatus senses the change of phase angle between the voltage and current applied to the electric motor when the motor is pumping water or doing work. The protection apparatus also senses the phase angle between the voltage and the current when the motor is not pumping water or doing work. It is significant to note that these parameter values are very similar for all motors of from one-third horsepower to one and one-half horsepower, both in wet and dry conditions. Thus, the apparatus of this invention eliminates the requirement for individual calibration for various three wire pump motors in this horsepower range.

By proper selection of components and by providing a unique enclosure configuration, all of the components of the pump protection apparatus of this invention are enclosed in a single cabinet.

BRIEF DESCRIPTION OF THE VIEWS OF THE DRAWINGS

FIG. 1 is a schematic diagram of the motor control circuitry of this invention. This view also illustrates that the entire circuitry may be positioned within a single housing. This figure also illustrates an electric motor which is operated through the circuitry and a pump which is operated by the motor.

FIG. 2 is a set of electric waveforms which illustrate operation of an electric motor while a liquid pump operated thereby is pumping liquid.

FIG. 3 is a set of electric waveforms which illustrate operation of the electric motor when the liquid pump is not pumping liquid.

DETAILED DESCRIPTION OF THE INVENTION

Figure 4:
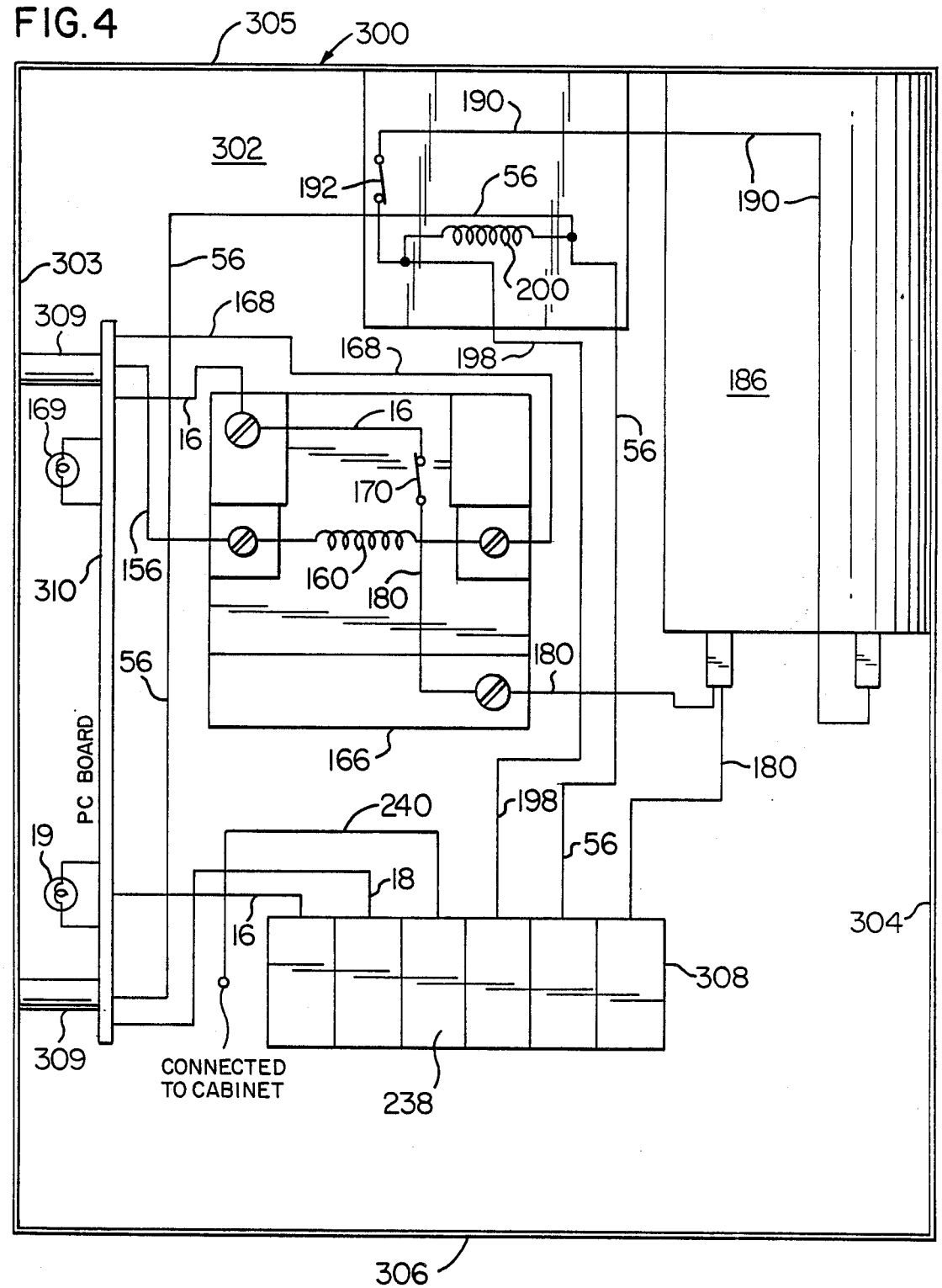
FIG. 4 is a diagrammatic view of an enclosure and showing all of the components of the motor control circuitry of FIG. 1 mounted within the enclosure.

The motor control circuitry of this invention provides electrical energy to an electric motor 10 which operates a water pump 12. The pump 12 and the motor 10 are conventionally submerged within a body of water from which water is pumped by the pump 12, with operation of the motor 10.

The electrical energy for operation of the electric motor 10 is provided through incoming lines 16 and 18. The incoming line 18 is shown as being grounded only for denoting a reference point for the electrical circuitry of this invention.

Joined to the incoming lines 16 and 18 are an indicator lamp 19 and a power supply unit 20 which provides electrical energy to the numerous devices of the circuitry. The power supply unit 20 is shown as having an output line 22 of positive potential, herein illustrated as 12 volts D.C., and an output line 24 of ground potential.

Connected between the incoming lines 16 and 18 is a resistor 28 and a resistor 30, which are connected in series to constitute a voltage divider circuit. An operational amplifier 34 has an input terminal 36 joined to the resistors 28 and 30. Another terminal 38 of the operational amplifier 34 is shown connected to ground potential.

An operational amplifier 44 has a terminal 46 joined to ground potential and a terminal 48 joined to a resistor 50. The resistor 50 is connected to the incoming line 18 through a resistor 58. The resistor 58 is joined to a line 56.

The operational amplifier 34 has an output terminal 60 connected to a terminal 64 of an exclusive-OR-gate device 66. The operational amplifier 44 has an output terminal 70 joined to a terminal 72 of the exclusive-OR-gate device 66. The exclusive-OR-gate device 66 has an output terminal 78 joined to a resistor 80 which is connected to ground potential through a capacitor 82. The resistor 80 is also connected to an input terminal 86 of an operational amplifier 88. The operational amplifier 88 also has an input terminal 90 connected to a reference potential through an adjustable resistor 92. The adjustable resistor 92 is also shown connected to an output terminal 93 of an operational amplifier 94. The operational amplifier 94 has an input terminal 95 which is connected to the output terminal 93. The operational amplifier 94 also has an input terminal 96 which is joined to a capacitor 97 and to resistors 98 and 99. The resistor 98 is also connected to ground potential. The resistor 99 is also joined to a diode 100, which is connected to the incoming line 16.

The operational amplifier 88 has an output terminal 101 connected to a resistor 102. The resistor 102 is also joined to an input terminal 103 of an operational amplifier 104. The operational amplifier 104 also has an input terminal 106 which is connected to ground potential through a resistor 110. A resistor 112 is also connected to the input terminal 106 and to the output of the power supply unit 20. Connected across the resistor 112 is a momentary reset switch 118. The operational amplifier 104 has an output terminal 124 which is connected to the input terminal 103 through a resistor 130.

The output terminal 124 of the operational amplifier 104 is also joined to a resistor 134 which is also connected to a base 140 of a transistor 144. The transistor 144 also has an emitter 148 which is shown connected to ground potential. The transistor 144 also has a collector 152 which is joined by a conductor 156 to one side of an actuator coil 160 of a power switch 166. The other side of the actuator coil 160 is connected by a conductor 167 to an indicator lamp 169. The indicator lamp 169 is connected to a rectifier diode 171 which is connected to the line 16. A diode 168 is shown connected across the actuator coil 160.

The power switch 166 has a normally-closed switch member 170 which is joined to an output line 180. Joined to the line 180 is a capacitor 186. A conductor 190 joins the capacitor 186 to one side of a switch 192. The other side of the switch 192 is attached to a conductor 198 and to one side of an actuator coil 200. The other side of the actuator coil 200 is connected to the line 56. The switch 192 is normally closed and is opened by energization of the actuator coil 200.

All of the components and circuitry described above are contained within a single enclosure or cabinet 300.

The conductor 198 is joined to one side of a start winding 206 of the electric motor 10. The other side of the start winding 206 is connected to one side of a run winding 208 of the motor 10 and to the line 56. The other side of the run winding 208 of the motor 10 is connected to the line 180.

FIGS. 1 and 4 show a ground wire connector 238. The ground wire connector 238 is shown adjacent the incoming line 18 or L2. The ground wire connector 238 is joined to a ground line 240. The ground line 240 is attached to the cabinet 300.

OPERATION

A suitable voltage is applied to the incoming lines 16 and 18 for operation of the electric motor 10 and for energization of the elements of the control circuitry. When the lines 16 and 18 are energized the indicator lamp 19 is lighted. Customarily, an alternating current voltage in the order of 115 volts or 230 volts is applied to the lines 16 and 18. The voltage applied to the incoming lines 16 and 18 is applied to the motor 10 through the normally closed switch 170 to the line 180 and through the line 56. When current initially flows through the lines 180 and 56 current flows to the run winding 208 of the motor 10. Current also flows through the capacitor 186, through the conductor 190, through the switch 192, and through the conductor 198 to the start winding 206. Thus, the motor 10 is energized and the rotor thereof begins to rotate.

The actuator coil 200 is in parallel relationship with the start winding 206. Therefore, as the rate of rotation of the rotor of the motor 10 increases, a counter electromotive force voltage is created in the start winding 206 and in the actuator coil 200. When the counter electromotive force voltage reaches a predetermined magnitude, the voltage across the actuator coil 200 causes the switch 192 to open. Thus, the start winding 206 is disconnected from the line 180, and the motor 10 is operated solely by the run winding 208.

The power supply output lines 22 and 24 are effectively joined, in a manner not illustrated, to devices of the circuitry such as the devices 34, 44, 66, 88, and 104 for energization thereof.

The input terminals 36 and 38 of the operational amplifier 34 are connected to sense the voltage between the incoming lines 16 and 18. The output of the operational amplifier 34 at the output terminal 60 is positive, herein shown as 12 volts, during each positive half cycle of the voltage applied to the input lines 16 and 18. During each negative half cycle of this voltage, the output voltage of the operational amplifier 34 is applied to the input terminal 64 of the exclusive-OR-gate 66.

The signal applied to the terminals 46 and 48 of the operational amplifier 44 is a voltage generated by current flow through the resistor 58. Therefore, the voltage applied to the terminals 46 and 48 is in phase with the current flow through the resistor 58 and in phase with the current flow in the line 56. The signal at the output terminal 70 of the operational amplifier 44 is positive, herein shown as 12 volts, during each positive half cycle of the current flow through the resistor 58. During each negative half cycle of the current flow through the resistor 58 the output voltage of the operational amplifier 44 at the output terminal 70 is zero. This output voltage of the operational amplifier 44 is applied to the terminal 72 of the exclusive-OR-gate 66. The exclusive-OR-gate 66 herein serves as a phase detector.

FIG. 2 shows waveforms 250, 260, and 270, which illustrate conditions within the electric motor 10 during the time that the motor 10 is pumping water. Waveform 250 represents the voltage at the output terminal 60 of the operational amplifier 34, which voltage is in phase with the voltage across the incoming lines 16 and 18. Waveform 260 represents the voltage at the output terminal 70 of the operational amplifier 44, which voltage is in phase with the current flow in the incoming line 18. Waveform 270 of FIG. 2 illustrates the voltage at the output terminal 78 of the exclusive-OR-gate 66, and also illustrates the magnitude of the phase angle between the voltage applied across incoming lines 16 and 18 and the current in the power line 56. Due to the fact that the motor 10 under normal load conditions has less than unity power factor, there is a phase angle between the voltage and current applied to the motor 10, as illustrated in FIG. 2.

It is to be noted that the waveform 270 in FIG. 2, which illustrates the voltage at the output terminal 78 of the exclusive-OR-gate 66, is positive only during the period of time that only one of the waveforms 250 and 260 is zero. The voltage represented by the waveform 270 has an average voltage level 280, as illustrated in FIG. 2. This average voltage level 280 is relatively low because the voltage represented by the waveform 270 is zero during most of the time.

If the supply of water to the pump 12 ceases, the pump 12, operated by the motor 10, does not pump water. Under such conditions the circuitry of this invention functions as illustrated in FIG. 3. It is noted that the phase angle between the voltage and the current applied to the motor 10 increases significantly over that illustrated in FIG. 2. Therefore, the period of time during which there is a voltage at the output terminal 78 of the exclusive-OR-gate 66 is significantly increased, as illustrated by the waveform 270 in FIG. 3. In both FIGS. 2 and 3 the average voltage level 280 is directly proportional to the phase angle between the waveforms 250 and 260. As illustrated in FIG. 3, the average output voltage 280 at the terminal 78 of the exclusive-OR-gate 66 is significantly greater during the time that the pump 12, operated by the electric motor 10, is not pumping water, and as the motor 10 continues to operate. This average output voltage 280 at the terminal 78 is applied to the resistor 80 and to the capacitor 82, which serve to filter the alternating current component from this output voltage and to provide the average direct current voltage 280, illustrated in FIG. 3, to the input terminal 86 of the operational amplifier 88.

The operational amplifier 88 compares the voltage applied to the terminal 86 with a voltage applied to the terminal 90 thereof. The voltage applied to the terminal 90 is a direct current voltage proportional to the alternating current line voltage across lines 16 and 18. The voltage applied to the terminal 90 is adjustable through the resistor 92. The alternating current voltage at the line 16 is rectified by the diode 100 and is directed to the voltage divider formed by the resistors 99 and 98. The voltage at the junction of the resistors 98 and 99 is filtered by the capacitor 97 and is supplied to the input terminal 96 of the operational amplifier 94. The operational amplifier 94 is connected as a unitary gain buffer which transmits the voltage on the capacitor 97 to the resistor 92. This voltage is applied to the input terminal 90 of the operational amplifier 88. Therefore, the voltage applied to the input terminal 90 of the operational amplifier 88 is proportional to the alternating current line voltage between the lines 16 and 18. Thus, there is compensation for phase angle variations which may occur with variations in the voltage applied to the incoming lines 16 and 18.

During the time that the average voltage level 280 of the exclusive-OR-gate 66 is relatively low, as illustrated in FIG. 2., the voltage applied to the terminal 86 of the operational amplifier 88 is less than the voltage applied to the terminal 90 of the operational amplifier 88. Under these conditions, there is no output from the operational amplifier 88 at the output terminal 101.

However, when the pump 12 which is operated by the motor 10 ceases to pump water, and the conditions become those which are illustrated in FIG. 3, the average voltage level 280 illustrated in FIG. 3 becomes so great that the voltage applied to the terminal 86 of the operational amplifier 88 exceeds the voltage applied to the terminal 90 of the operational amplifier 88. Therefore, the operational amplifier 88 produces a voltage at the output terminal 101 thereof. This voltage is transmitted to the input terminal 103 of the operational amplifier 104. This voltage which is applied to the terminal 103 of the operational amplifier 104 is greater than the constant voltage applied to the terminal 106 thereof. Therefore, a positive signal is created at the output terminal 124 of the operational amplifier 104. A positive feedback voltage is applied to the input terminal 103 from the output terminal 124 of the operational amplifier 104, through the resistor 130. Thus, there is a constant output voltage at the terminal 124 of the operational amplifier 104, beginning the instant that a voltage output is initiated at the terminal 124. Thus, a "latch-in" condition exists.

The output voltage at the terminal 124 of the operational amplifier 104 creates a current flow through the resistor 134 to the base 140 of the transistor 144. When this occurs, the transistor 144 transmits current through the actuator coil 160. This current flow operates the power switch 166 to open the switch member 170. When this occurs, the electric motor 10 is deenergized, and the pump 12 ceases to operate. When the actuator coil 160 is energized the indicator lamp 169 is lighted, and an observer will note that deenergization of the motor 10 has occurred.

Thus, the pump 12 is protected against damage which occurs if the pump 12 should be operated without pumping water.

The reset switch 118 is employed to momentarily connect the terminal 106 of the operational amplifier 104 to the full power supply voltage to increase the voltage applied to the terminal 106, to deenergize the operational amplifier 104 when the pump 12 again has water to pump. The reset switch 118 may be operated manually or automatically.

FIG. 4 illustrates the cabinet 300 within which all of the control components for the motor 10 are housed. The cabinet 300 has a back wall 302 and side walls 303 and 304. The cabinet 300 also has a top wall 305 and a bottom wall 306. FIG. 4 shows the preferred arrangement of the components of the water pump protector unit of this invention within the cabinet 300.

A terminal board 308 is mounted upon the back wall 302 adjacent the bottom wall 306 of the cabinet 300. All of the electronic control elements are carried by a circuit board 310, which is attached by means of support elements 309 to the side wall 303 and adjacent thereto. The circuit board 310 has major opposed surfaces which are substantially parallel to the side wall 303 of the cabinet 300.

The power switch 166 is mounted upon the back wall 302 near the central portion of the cabinet 300.

The switch 192 and the actuator coil 200 are mounted upon the back wall 302 adjacent the upper wall 305, adjacent the central part of the upper wall 305.

The start capacitor 186 is mounted upon the back wall 302 at the upper right portion of the cabinet 300.

FIG. 4 also shows the wiring between the components of the motor control apparatus.

In view of the fact that the pump protector unit of this invention is used primarily with three-wire capacitor-start induction-run motors the motor operating parameters are very uniform and predictable. Therefore, a pump protector unit of this invention is capable of operating and controlling any capacitor-start induction-run motor which has a rating of at least as small as one-third horsepower to at least as large as one and one-half horsepower. Calibration of the circuitry is not necessary.

Due to the fact that all of the components of the pump protector unit of this invention are housed within a single cabinet, the costs are minimum and minimum time and expense are involved in an installation of a pump protector unit of this invention.

Although the preferred embodiment of the water pump protector unit of this invention has been described, it will be understood that within the purview of this invention various changes may be made in the form, details, proportion and arrangement of parts, the combination thereof, and the mode of operation, which generally stated provide a water pump protector unit within the scope of the appended claims.

The invention having thus been described, the following is claimed:

1. A protective circuit for a liquid pump which is operated by an electric motor, of the type having a start winding and a run winding, alternating current electric circuit means for connection to a source of electrical energy and for energization of the electric motor, the alternating current electric circuit means being of the type provided with a first conductor and a second conductor, the combination comprising:

sensing means including first sensing means, the first sensing means sensing the alternating current voltage applied to the electric circuit means and providing a constant direct current voltage during each half cycle that the voltage applied to the electric circuit means has a given potential, second sensing means, the second sensing means sensing the alternating current flow in the electric circuit means and providing a constant direct current voltage during each half cycle that alternating current flow is in a given direction, phase detector means, first connection means, the first connection means joining the first and second sensing means to the phase detector means, the phase detector means providing a direct current voltage output during the time one of the first sensing means and the second sensing means produce a direct current voltage, voltage level detector means, second connection means, the second connection means joining the voltage level detector means to the phase detector means and to the alternating current electric circuit means and providing a direct current potential during the time that the average direct current voltage output of the phase detector means exceeds a potential applied to the voltage level detector means from the electric circuit means, third connection means, the third connection means joining the voltage level detector means to the sensing means for deenergization of the electric motor when the average current voltage output of the phase detector means provides a direct current potential in excess of a given magnitude, a start switch, means connecting the start switch to the start winding of the electric motor, a switch actuator coil, means connecting the switch actuator coil to the start winding of the electric motor, a capacitor, means connecting the capacitor to the first conductor and to the start switch, means connecting the run winding to the first conductor and to the second conductor, and enclosure means mounting said sensing means and said phase detector means and said first connection means and said voltage level detector means and said second connection means and said third connection means within a common enclosure.

2. The protective circuit of claim 1 in which the enclosure means comprises a single cabinet.

3. The protective circuit of claim 1 wherein the enclosure means is in the form of a cabinet provided with a back wall, a top wall, a bottom wall and a pair of side walls attached to the back wall and extending substantially normal thereto, a support board, the sensing means and the phase detector means and the first connection means and the second connection means and the third connection means and the voltage detector means being supported by the support board.

4. The protective circuit of claim 1 wherein the enclosure means is in the form of a cabinet provided with a back wall, with a top wall, a bottom wall and a pair of side walls attached to the back wall and extending substantially normal thereto, a support panel, the sensing means and the phase detector means and the first connection means and the second connection means and the third connection means and the voltage detector means being supported by the support panel, the support panel being mounted in the cabinet adjacent one of the side walls and substantially parallel thereto.

5. A water pump protective and motor starting circuit for energization and control of an electric motor which operates a water pump, the electric motor being of the type having a start winding and a run winding, the protective unit being of the type which senses the operation of the electric motor when the pump is pumping water and when the pump is not pumping water and which deenergizes the electric motor when the pump is not pumping water, the protective unit comprising an electric circuitry which includes a first electric conductor and a second electric conductor, means connecting the first electric conductor and the second electric conductor to the run winding of the electric motor, a normally-closed start switch, means connecting the start switch to the start winding, a start switch actuator coil, means connecting the start switch actuator coil in parallel with the start winding, a capacitor, means connecting the capacitor to the first conductor and to the start switch, means connecting the first conductor and the second conductor to the run winding of the electric motor, whereby the run winding and the start winding are energized with energization of the first conductor and the second conductor, and whereby during starting of the electric motor the start winding provides a voltage to the start switch actuator coil, and whereby the start switch actuator coil opens the start switch when a voltage of a predetermined magnitude is applied to the start switch actuator coil by the start winding, and an enclosing cabinet which encloses all of the electric circuitry, whereby one set of electrical connections can be made for energization of all of the electric circuitry, and whereby installation of the water pump protective and motor start circuit is simplified.

6. A water pump protective and motor starting circuit for energization and control of an electric motor which operates a water pump, the electric motor being of the type having a start winding and a run winding, the protective unit being of the type which senses the operation of the electric motor when the pump is pumping water and when the pump is not pumping water and which deenergizes the electric motor when the pump is not pumping water, the protective unit comprising an electric circuitry which includes a first electric conductor and a second electric conductor, means connecting the first electric conductor and the second electric conductor to the run winding of the electric motor, a normally-closed start switch, means connecting the start switch to the start winding, a start switch actuator coil, means connecting the start switch actuator coil in parallel with the start winding, a capacitor, means connecting the capacitor to the first conductor and to the start switch, means connecting the first conductor and the second conductor to the run winding of the electric motor, whereby the run winding and the start winding are energized with energization of the first conductor and the second conductor, and whereby during starting of the electric motor the start winding provides a voltage to the start switch actuator coil, and whereby the start switch actuator coil opens the start switch when a voltage of a predetermined magnitude is applied to the start switch actuator coil by the start winding, and an enclosing cabinet which encloses all of the electric circuitry, the enclosing cabinet including a back wall, a pair of side walls, a support panel, a portion of the electric circuitry being carried by the support panel, the support panel having a major surface parallel to one of the side walls, whereby one set of electrical connections can be made for energization of all of the electric circuitry, and whereby installation of the water pump protective and motor start circuit is simplified.

7. Apparatus for energization and control of an electric motor which operates a liquid pump, the electric motor being of the type provided with a run winding and a start winding, comprising: a first electric conductor and a second electric conductor, a capacitor, means connecting the capacitor to the first electric conductor, a normally-closed switch, means connecting the normally-closed switch to the capacitor, means connecting the normally-closed switch to the start winding, a switch actuator, means connecting the switch actuator to the start winding and to the run winding, means connecting the second conductor to the start winding and to the run winding, whereby electric energy is applied to the run winding and to the start winding and whereby the switch actuator receives a voltage from the start winding and opens the normally-closed switch when a voltage of a predetermined magnitude is applied to the switch actuator by the start winding, control means connected to the electric conductors, the control means sensing the operation of the electric motor when the pump is pumping liquid, the control means sensing operation of the electric motor when the pump is not pumping liquid, the control means including actuator means for opening at least one of the electric conductors when the control means senses that the pump is not pumping liquid, thus deenergizing the electric motor, and an enclosure which encloses the electric conductors and the control means and the capacitor and the normally-closed switch and the switch actuator, whereby one set of electrical connections can be made for energization of all of the electrical circuitry, and whereby installation of the water pump control apparatus is simplified.

* * * * *